US 10,917,771 B2

(12) United States Patent
Orris et al.

(10) Patent No.: US 10,917,771 B2
(45) Date of Patent: Feb. 9, 2021

(54) SYSTEM FOR SMART CHILD SEAT VEHICLE INTEGRATION

(71) Applicant: FORD GLOBAL TECHNOLOGIES, LLC, Dearborn, MI (US)

(72) Inventors: David Joseph Orris, Southgate, MI (US); David Michael Herman, Southfield, MI (US); David A. Herman, Southfield, MI (US); Nunzio DeCia, Northville, MI (US); Nicholas Alexander Scheufler, Flat Rock, MI (US); Stephen Jay Orris, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 506 days.

(21) Appl. No.: 15/864,854

(22) Filed: Jan. 8, 2018

(65) Prior Publication Data
US 2019/0215672 A1    Jul. 11, 2019

(51) Int. Cl.
*H04W 4/80* (2018.01)
*H04W 4/38* (2018.01)
(Continued)

(52) U.S. Cl.
CPC .......... *H04W 4/80* (2018.02); *B60H 1/00742* (2013.01); *B60H 1/00771* (2013.01); *B60H 1/00978* (2013.01); *B60N 2/002* (2013.01); *E05F 15/71* (2015.01); *E05F 15/73* (2015.01); *E05F 15/77* (2015.01);
(Continued)

(58) Field of Classification Search
CPC ........... H04W 4/80; H04W 4/38; H04W 4/90; B60N 2/002; B60N 2/28; E05F 15/73; E05F 15/77; E05F 15/71; B60H 1/00978; B60H 1/00771; B60H 1/00742; G05B 19/0428; G05B 2219/2637; G01S 19/13; E05Y 2400/44; E05Y 2400/52; E05Y 2400/85; E05Y 2900/55
See application file for complete search history.

(56) References Cited

U.S. PATENT DOCUMENTS

| 7,012,533 B2 * | 3/2006 | Younse | B60N 2/002 180/273 |
| 7,830,270 B1 * | 11/2010 | Philbert | B60N 2/002 340/667 |

(Continued)

FOREIGN PATENT DOCUMENTS

| EP | 3154037 A1 | 4/2017 |
| JP | 2005163702 A | * 12/2003 |
| WO | 2015118569 A1 | 8/2015 |

OTHER PUBLICATIONS

Sozaburo Tashiro, JP2005163702A machine translation, Dec. 2003, JPO (Year: 2003).*

*Primary Examiner* — Frederick M Brushaber
(74) *Attorney, Agent, or Firm* — Michael Spenner; Brooks Kushman PC

(57) ABSTRACT

A system for a vehicle comprises a controller, programmed to output a warning to a registered mobile device via a server over a wireless network, responsive to a safety event indicative of a child being left in the vehicle in a dangerous condition triggered responsive to detection of presence of the child in a car seat and failure to receive confirmation that an adult occupant is still in the vehicle.

19 Claims, 7 Drawing Sheets

(51) Int. Cl.

| | | |
|---|---|---|
| *H04W 4/90* | (2018.01) | |
| *B60N 2/00* | (2006.01) | |
| *E05F 15/73* | (2015.01) | |
| *E05F 15/71* | (2015.01) | |
| *B60H 1/00* | (2006.01) | |
| *G05B 19/042* | (2006.01) | |
| *G01S 19/13* | (2010.01) | |
| *E05F 15/77* | (2015.01) | |

(52) U.S. Cl.
CPC ......... *G05B 19/0428* (2013.01); *H04W 4/38* (2018.02); *H04W 4/90* (2018.02); *E05Y 2400/44* (2013.01); *E05Y 2400/52* (2013.01); *E05Y 2400/85* (2013.01); *E05Y 2900/55* (2013.01); *G01S 19/13* (2013.01)

(56) References Cited

U.S. PATENT DOCUMENTS

| | | | |
|---|---|---|---|
| 9,457,716 B2 * | 10/2016 | Westmoreland | B60J 1/17 |
| 2008/0004774 A1 * | 1/2008 | Wieczorek | B60R 21/00 |
| | | | 701/45 |
| 2013/0158862 A1 * | 6/2013 | Stahlin | G08G 1/162 |
| | | | 701/410 |
| 2013/0194089 A1 * | 8/2013 | Estrada | B60R 22/105 |
| | | | 340/457.1 |
| 2013/0238167 A1 * | 9/2013 | Stanfield | B60Q 1/2696 |
| | | | 701/2 |
| 2013/0267194 A1 * | 10/2013 | Breed | G08G 1/205 |
| | | | 455/404.2 |
| 2014/0320263 A1 * | 10/2014 | Fan | E05F 15/77 |
| | | | 340/5.71 |
| 2015/0087259 A1 * | 3/2015 | Hinsen | G08B 25/008 |
| | | | 455/404.2 |
| 2015/0201435 A1 * | 7/2015 | Fan | H04W 4/021 |
| | | | 455/404.2 |
| 2016/0029197 A1 * | 1/2016 | Gellens | H04Q 9/00 |
| | | | 455/404.1 |
| 2017/0026504 A1 * | 1/2017 | Nichols | A61B 5/746 |
| 2017/0175432 A1 * | 6/2017 | Dervitsiotis | G01W 1/10 |

* cited by examiner

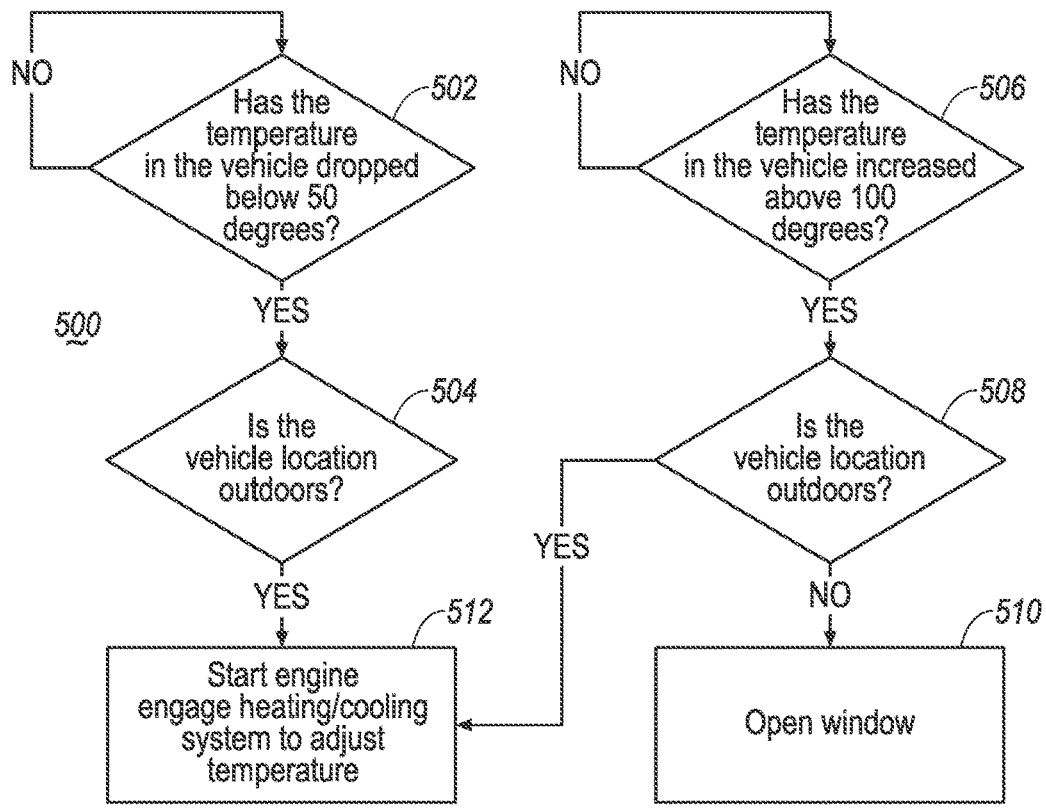
FIG. 5
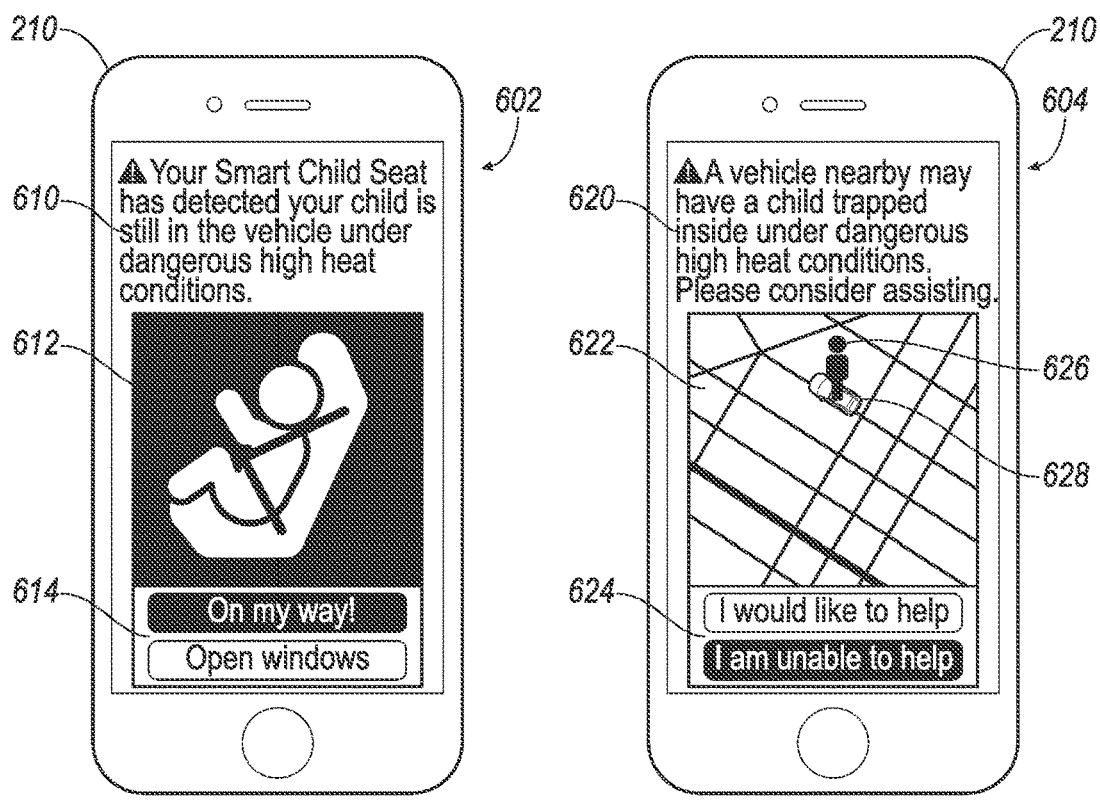
FIG. 6A
FIG. 6B

SYSTEM FOR SMART CHILD SEAT VEHICLE INTEGRATION

TECHNICAL FIELD

The present disclosure is generally related to a vehicle child seat integration. More specifically, the present disclosure is related to a vehicle system capable of integrating with child seat having sensors installed.

BACKGROUND

In many countries, it is a legal requirement for children under a certain age to ride in a car seat while travelling in a vehicle. Car seats are often aftermarket and manufactured by companies not associated with the vehicle manufacturers, leaving little or no interface extendibility to communicate with the vehicle system. The lack of communication between the vehicle and the car seat may be potentially dangerous. For instance, a child may be left behind in a hot vehicle. The car seat may be damaged and unsafe to be used, but the vehicle occupants have no knowledge of it.

SUMMARY

In one or more illustrative embodiments, a system for a vehicle comprises a controller, programmed to output a warning to a registered mobile device via a server over a wireless network, responsive to a safety event indicative of a child being left in the vehicle in a dangerous condition triggered responsive to detection of presence of the child in a car seat and failure to receive confirmation that an adult occupant is still in the vehicle.

In one or more illustrative embodiments, a system for a vehicle comprises a processor, programmed to responsive to a crash event, check whether a child is present in a car seat having sensing capability and wirelessly connected to the system; and send a rescue request to a third party using at least one of Bluetooth Low Energy (BLE) Beacon or a Dedicated Short-Range Communications (DSRC) channel.

In one or more illustrative embodiments, a vehicle system comprises a controller, programmed to output a warning responsive to receiving a sensor signal from a car seat indicative of a safety event, wherein the controller is wirelessly connected to a central smart module of the car seat configured to collect signals from a plurality of sensors installed on the car seat.

The details of one or more implementations are set forth in the accompanying drawings and the description below. Other features and advantages will become apparent from the description, the drawings, and the claims.

BRIEF DESCRIPTION OF THE DRAWINGS

FIG. 5 illustrates an example flow diagram of a background process of one embodiment of the present disclosure;

FIG. 6A illustrates an example screenshot of the push notification displayed on the mobile device of the user;

FIG. 6B illustrates an example screenshot of the polling notification displayed on the mobile device of a passerby;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle smart child seat integration scheme. More specifically, the present disclosure proposes a vehicle system capable of communicating with a smart car seat equipped with sensors to determine a presence and condition of a child in the car seat.

Figure 1:
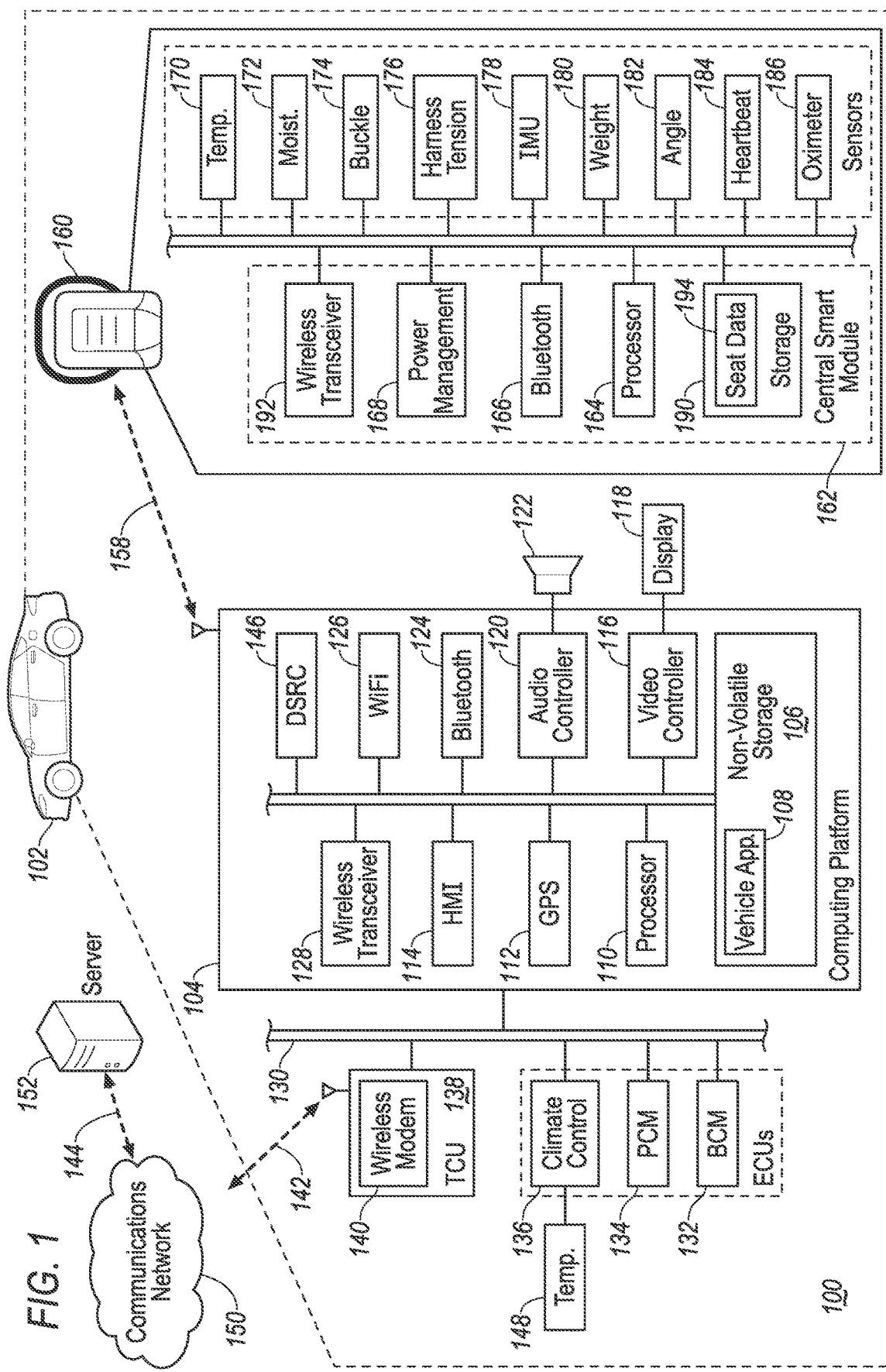
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. In an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 110 configured to perform instructions, commands, and other routines in support of the processes described herein. For instance, the computing platform 104 may be configured to execute instructions of vehicle applications 108 to provide features such as navigation, accident reporting, satellite radio decoding, child seat data processing, and warning reporting. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 110 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 114 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 118 configured to provide visual output to vehicle occupants by way of a video controller 116. In some cases, the display 118 may be a touch screen further configured to receive user touch input via the video controller 116, while in other cases the display 118 may be a display only, without touch input capabilities. The computing platform 104 may also drive or otherwise communicate with one or more speakers 122 configured to provide audio output to vehicle occupants by way of an audio controller 120.

The computing platform 104 may be provided with location service features through a Global Positioning System (GPS) module 112 configured to provide location data of the vehicle 102. The location data provided by the GPS module 112 may be used for navigation proposes. Additionally or alternatively, the location data may also be used to locate the vehicle 102 by a third party in case of an emergency. The computing platform 104 may also be provided with capabilities to communicate with other vehicles located within a certain range of the vehicle 102 through a Dedicated Short-Range Communications (DSRC) module 146.

The computing platform 104 may be configured to communicate with a smart child seat (a.k.a. "car seat") 160 via a wireless connection 158. Alternatively, the smart child seat may be configured to connect to the computing platform 104 via a wired connection (not shown). The smart child seat 160 may be a child seat having sensors, processing, and communication capabilities. The child seat 160 may include various types of seat to accommodate children of various ages. As an example, the smart child seat 160 may be an infant safety seat, child safety seat, or booster seat. In many examples, the computing platform 104 may include a wireless transceiver 128 in communication with a Bluetooth module 124, a WiFi module 126, and other modules such as a Zigbee transceiver, an IrDA transceiver, an RFID transceiver (not shown), configured to communicate with a compatible wireless transceiver 192 of the smart child seat 160.

The smart car seat 160 may include a plurality of sensors configured to collect various signal data, and a central smart module 162 configured to process data collected by sensors and communicate with the computing platform 104. As a few nonlimiting examples, the sensors may include a temperature sensor 170 configured to collect temperature data of a child positioned in the smart child seat 160; a moisture/humidity sensor 172 configured to monitor any spills or leaks in the car seat 160; a harness buckle sensor 174 configured to detect buckling and unbuckling of harness straps of the car seat 160; a harness strap tension sensor 176 configured to measure the tension setting on the harness straps; a lateral sway Inertial Measurement Unit (IMU) sensor 178 configured to detect motion of the car seat 160 to measure whether the car seat 160 is installed correctly; a weight sensor 180 configured to detect the presence of a child and misuse such as the child is exceeding or below the recommended weight limit of the car seat 160 and output a warning signal responsive to detecting misuse; an angle sensor 182 configured to measure the angle of the car seat 160 and whether the car seat 160 is installed correctly; a heartbeat sensor 184 configured to measure the heartbeats of the child; and an oximeter sensor 186 configured to measure the oxygen level of the child to prevent positional asphyxia.

The central smart module 162 of the car seat 160 may be configured to receive the various signals sent from the sensors and store the signals in a non-volatile storage 190 as seat data 194. The seat data 194 may also include meta data of the smart child seat 160, such as a suggested expiration date of the car seat 160 and crash incident data occurring to the car seat 160. The seat data 194 may also include the serial number of the car seat 160 which may be used for identification and recall purposes. The central smart module 162 may be provided with processing capability using a processor 164 to processor signals collected by the various sensors. Alternatively, the central smart module 162 may transmit the collected signals to the computing platform 104 for processing via a wireless transceiver 192. The wireless transceiver 192 may be in communication with a BLUETOOTH module 166 configured to support BLUETOOTH Low Energy (BLE) protocol or other BLUETOOTH protocols.

The central smart module 162 may be provided with a power management module 168 configured to manage the power of the central smart module 162 as well as the sensors. As an example, the smart child seat may be powered by a battery (not shown) by way of the power management module 168. Since the battery capacity is often limited, in this example, the signals collected by the various sensors may be preferably transmitted to the computing platform 104 for processing to save battery power of the car seat 160. Alternatively, the computing platform 104 and the smart child seat 160 may be configured to share the processing load by each processing a portion of the signal data from the sensors. In an alternative example, the smart child seat 160 may be powered by the vehicle battery (not shown) through a cable connection (not shown). The cable connection may be a connection through a power socket (e.g., a 12 Volt cigarette lighter) to supply power to the car seat 160.

Alternatively, the cable connection may also be configured to communicate data between the computing platform 104 and the car seat 160 via a port compatible with data transmission protocols, such as a USB port. In an alternative example, the smart child seat 160 may be provided with wireless charging capability using a wireless charger (not shown) configured to wirelessly receive power by way of the power management module 168. The computing platform 104 may be provided with a wireless charging base (not shown) positioned near a rear seat corresponding with the wireless charger of the smart child seat 160, configured to convey power to the smart child seat 160 via an electric-magnetic field.

During the installation process, a user of the vehicle 102 may use the HMI controls 114 to pair the smart child seat 160 with the computing platform 104 via a wireless connection 158. For instance, the wireless connection 158 may be a BLE connection. Responsive to a successful pairing, the HMI controls 114 may confirm that the smart child seat 160 is found and indicate available sensor signal information. The user may select to receive notifications on any sensor anomalies via the display 118, the speaker 122 or any other output devices (e.g., a dashboard indicator). As a few nonlimiting examples, a signal from the weight sensor 180 may indicate a child is present when the vehicle 102 ignition is off; a signal from the harness buckle sensor 174 may indicate the child unfastens a belt while the vehicle 102 is in motion; signals from the heartbeat sensor 184 and the oximeter sensor 186 may indicate the child experiences a positional asphyxia which needs to be addressed immediately; a signal from the temperature sensor 170 may indicate the child experiences overheating; a signal from the moisture/humidity sensor may indicates there is a spill or the child has a full diaper; a signal from the angle sensor 182 may indicate the seat is positioned at a wrong angle which is dangerous for the child; a signal from the lateral sway IMU sensor 178 may indicate excessive sway when the vehicle 102 turns suggesting the smart child seat 160 is not installed properly; and etc. Depending of the sensor configuration of the smart child seat 160, more or fewer signals may be collected and analyzed by the processor 110 of the computing platform 104 and the processor 164 of the smart child seat 160.

Responsive to the detection of an anomaly, the computing platform 104 may notify the user via the speaker 122 or the display 118 and invite the user to address the issue. Depending on the seriousness of the anomaly, different levels of notification/warning may be utilized. In an example, if signals from the heartbeat sensor 184 and the oximeter sensor 186 indicate the child is experiencing a positional asphyxia which may be life threatening, appropriate actions may be taken. For instance, the computing platform 104 may be configured to output a warning using the display 118 and the speaker 122 to urge the user to stop the vehicle 102 and address the issue, and not allow the user to skip and delete the warning until the hazard is addresses and removed. In contrast, when the lateral sway IMU sensor 178 sends a signal indicative of excessive sway on the smart child seat 160 while the vehicle 102 is in motion, the computing platform 104 may be configured to only output a notification to invite the user to check the installation when the vehicle 102 is stopped so the user is not distracted while driving.

In addition, the seat data 194 stored in the storage 190 may be used for safety analysis. As an example, the seat data 194 may indicate safety hazards including expiration of the smart child seat; a previous crash incident has damaged the seat; failure to communicate with one or more of the sensors; and etc. Responsive to receiving seat data 194 indicative of safety hazards, the computing platform 104 may be configured to output notifications about the hazards.

It is noted that, the computing platform 104 may also be configured to output warnings/notification to other devices connected thereto. For instance, the computing platform 104 may be configured to output a warning to a mobile device (not shown) that is connected to the computing platform via a wireless connection such as a BLUETOOTH connection.

The computing platform 104 may also be configured to enable processing of the various signals sent from the smart child seat 160 in a cloud-based manner through a Telematics Control Unit (TCU) 138 connected via an in-vehicle network 130. The in-vehicle network 130 may include, but is not limited to, one or more of a controller area network (CAN), an Ethernet network, and a media oriented system transport (MOST), as some examples. The TCU 138 may be provided with a wireless modem 140 configured to communicate with a server 152 via a communication network 150. As an example, the communication network is a cellular network. The computing platform 104 may be configured to upload sensor signal data to the server 152 for processing via the TCU 138 and download the processing result from the server 152 when the processing is completed.

The computing platform 104 may also be configured to communicate with various Electronic Control Units (ECUs) via the in-vehicle network 130 to perform various features. As a few nonlimiting examples, the ECUs may include a Body Control Module (BCM) 132 configured to control the vehicle 102 body functions such as open/close windows, and lock/unlock doors; a Power-Train Control Module (PCM) 134 configured to control the power train of the vehicle 102 such as start/stop the engine/motor; and a climate control module 136 configured to control the climate system of the vehicle 102 using cabin temperature data collected by a temperature sensor 148.

Figure 2:
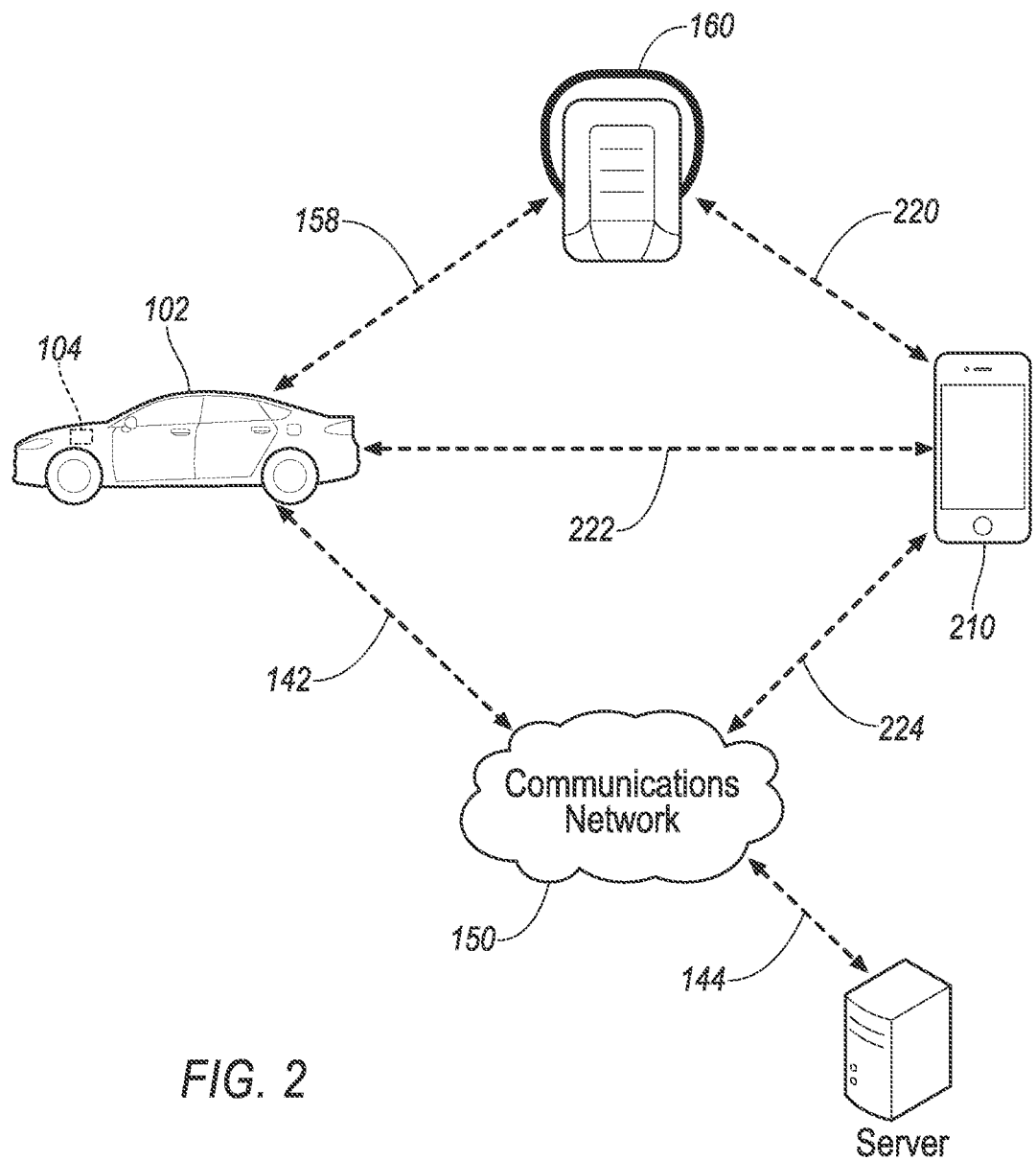
FIG. 2 illustrates an example topology of a smart child seat notification system of one embodiment of the present disclosure.

With continuous reference to FIG. 1, FIG. 2 illustrates an example topology of a smart child seat notification system 200 of one embodiment of the present disclosure. In addition to the configuration discussed with reference to FIG. 1, the computing platform 104 of the vehicle 102 is further configured to communicate with a mobile device 210 (e.g. a cell phone) via a wireless connection 222. As an example, the mobile device 210 may be configured to connect to the computing platform 104 via Bluetooth. Alternatively, the mobile device 210 may be configured to connect to the computing platform 104 via WiFi. Alternatively, the mobile device 210 may also be connected to the computing platform 104 via a wired connection (not shown) through a connecting port, such as a USB port. The mobile device 210 may be further configured to connect to smart child seat 160 via a wireless connection 220. For instance, the wireless connection 220 may be a BLE or Bluetooth connection. The mobile device 210 may also provide the capability to communicate with the communication network 150. Accordingly, the mobile device 210 may still be able to communicate with the computing platform 104 when the wireless connection 222 is disengaged. In this case, the mobile device 210 may be previously registered to the computing platform 104 and capable of receiving messages and notifications sent from the computing platform 104 via the communication network 150.

In this embodiment illustrated in FIG. 2, a user may detect a child left behind in the vehicle 102 using the mobile device 210. When a user travels in the vehicle 102 with a child, the weight sensor 180, as well as other sensors such as the heartbeat sensor 184 may detect the presence of the child in the smart child seat 160. The central smart module 162 may communicate the detection of the child's presence to the computing platform 104 via the wireless connection 158 and the mobile device 210 via the wireless connection 220. Alternatively, the central smart module 162 may be configured to only transmit the signal to the computing platform 104 to save power, and the computing platform 104 may communicate the presence of the child to the mobile device 210 via the wireless connection 222. Since the wireless connections 220, 222 are near field communications (e.g. Bluetooth or WiFi), the connections will only establish when the mobile device is at the vicinity of the vehicle 102 (e.g. inside the vehicle 102). Assuming the user carries the mobile device 210 in person, when he/she leaves the vehicle 102 and forgets about the child who is still in the seat, the smart child seat 160 may still detect the presence of the child as the sensors and central smart module 162 are still active. In addition, both the computing platform 104 and the smart child seat 160 may detect the disengagement of the wireless connections 222, 220 with the mobile device 210. If the child is not removed from the smart child seat 160 within a predefined period of time (e.g., 30 seconds after all doors have been closed and locked), it is quite possible that the user had forgotten about the child, potentially putting the child in a dangerous condition. In this case, the computing platform 104 may be configured to output a notification to remind the user about this situation. As an example, the computing platform 104 may be configured to trigger the alarm of the vehicle 102 as the notification. Additionally or alternatively, the computing platform 104 may be configured to send a message to the previously-registered mobile device 210 via the communication network 150 to remind the user.

Figure 3:
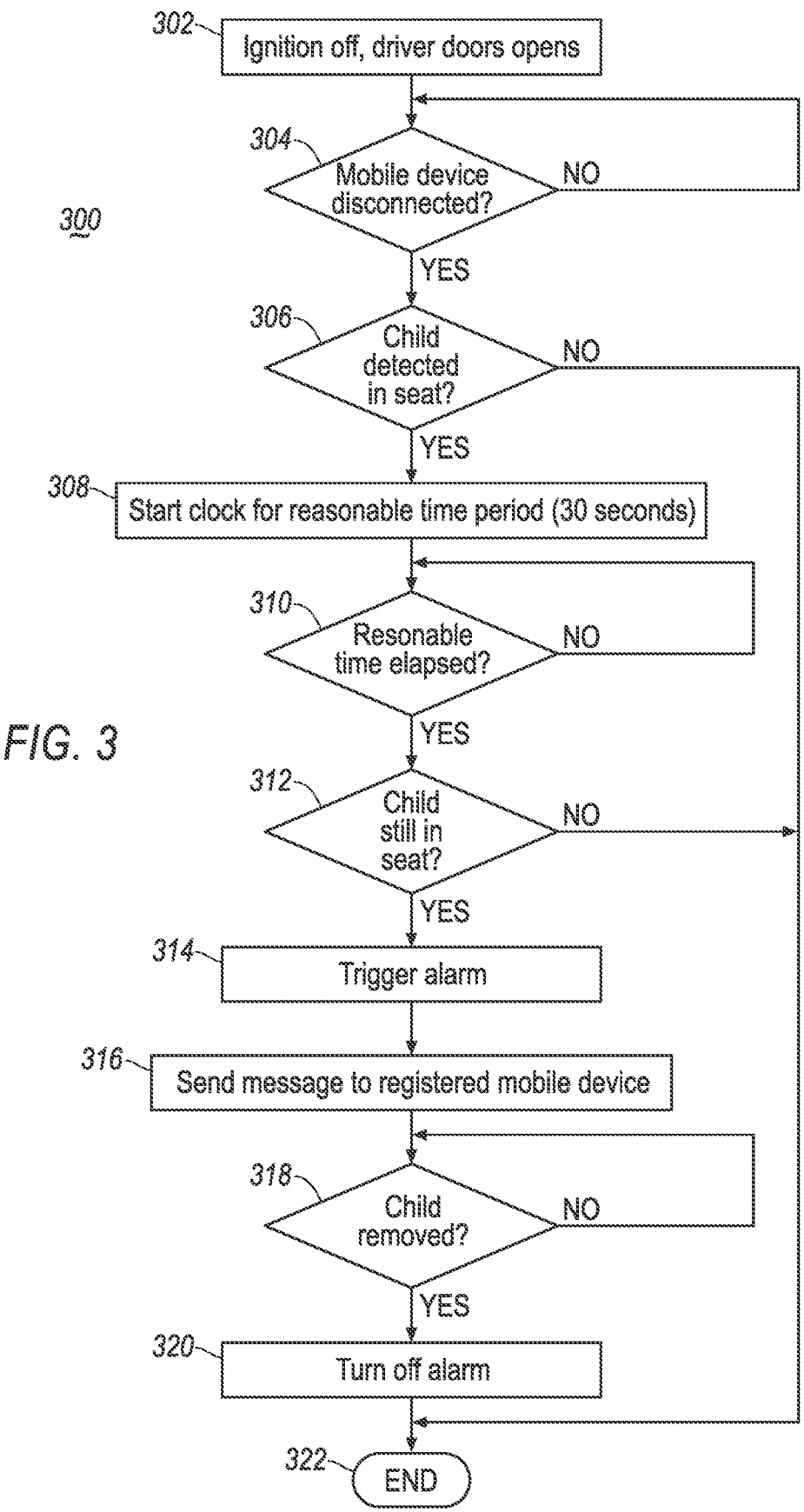
FIG. 3 illustrates an example flow diagram for a child left behind notification process of one embodiment of the present disclosure.

FIG. 3 illustrates an example flow diagram of process 300 for a child left behind notification of one embodiment of the present disclosure. At operation 302, the computing platform 104 detects the vehicle ignition is turned off and the driver door is opened indicating the driver/user may have got out of the vehicle 102 after reaching his/her destination. At operation 304, the computing platform 104 checks whether the mobile device is disconnected from the computing platform to further confirm that the user has left the vehicle 102. Here, it is assumed that the user carries the mobile device in his/her person. Since the wireless connection 222 between the computing platform 104 and the mobile device 210 is a near field connection which will disengage when the mobile device 102 leaves the vicinity of the vehicle 102, it can be assumed that the user is leaving the vehicle and no child should be left behind in this case.

At operation 306, the computing platform 104 detects whether there is a child left in the smart child seat 160. As previously discussed, the presence of a child may be detected by sensors such as a weight sensor 180 of the smart child seat 160 and the sensor signal may be transmitted to the computing platform 104 via the wireless connection 158. If no child is detected in the car seat 160, the process ends. If a child is detected, the control passes to operation 308.

At operation 308, the computing platform 104 starts a timer for a predefined time period to allow the user to remove the child from the smart child seat 160. As an example, the predefined time period may be 30 seconds. Depending on different user habits, different time period may be used, and the computing platform 104 may be configured to allow the user to adjust the length of the time period via the HMI controls 114. At operation 310, the computing platform 104 checks whether the time period has elapsed. When the predefined time period has elapsed, the control is passed to operation 312.

At operation 312, the computing platform 104 checks whether the child has been removed from smart child seat 160. If child is no longer in the seat, the process ends. Otherwise, if the computing platform 104 determines that the child is still in the smart child seat 160, the control is passed to operation 314.

At operation 314, the computing platform 104 triggers the alarm of the vehicle 102 to summon the user back. Since only a reasonably short time period (e.g., 30 seconds) has elapsed, the user may be still near the vehicle and therefore able to hear and respond to the alarm. In addition to the user, someone near the vehicle 102 may also respond to the alarm and render help.

To increase the chance that the user is notified about the situation, the computing platform 104 may be further configured to send a message to the user's registered mobile device 210 via the communication network 150. The message may include a text message or a voice message notifying there is a child in the car seat 160. It is noted that the mobile device 210 needs to be previously registered to the computing platform 104 to receive the message.

At operation 318, the computing platform 104 continues to check whether the child has been removed from the car seat 160. Responsive to a detection that the child is removed, the control is passed to operation 320 to turn off the alarm.

The process ends at operation 322.

Figure 4:
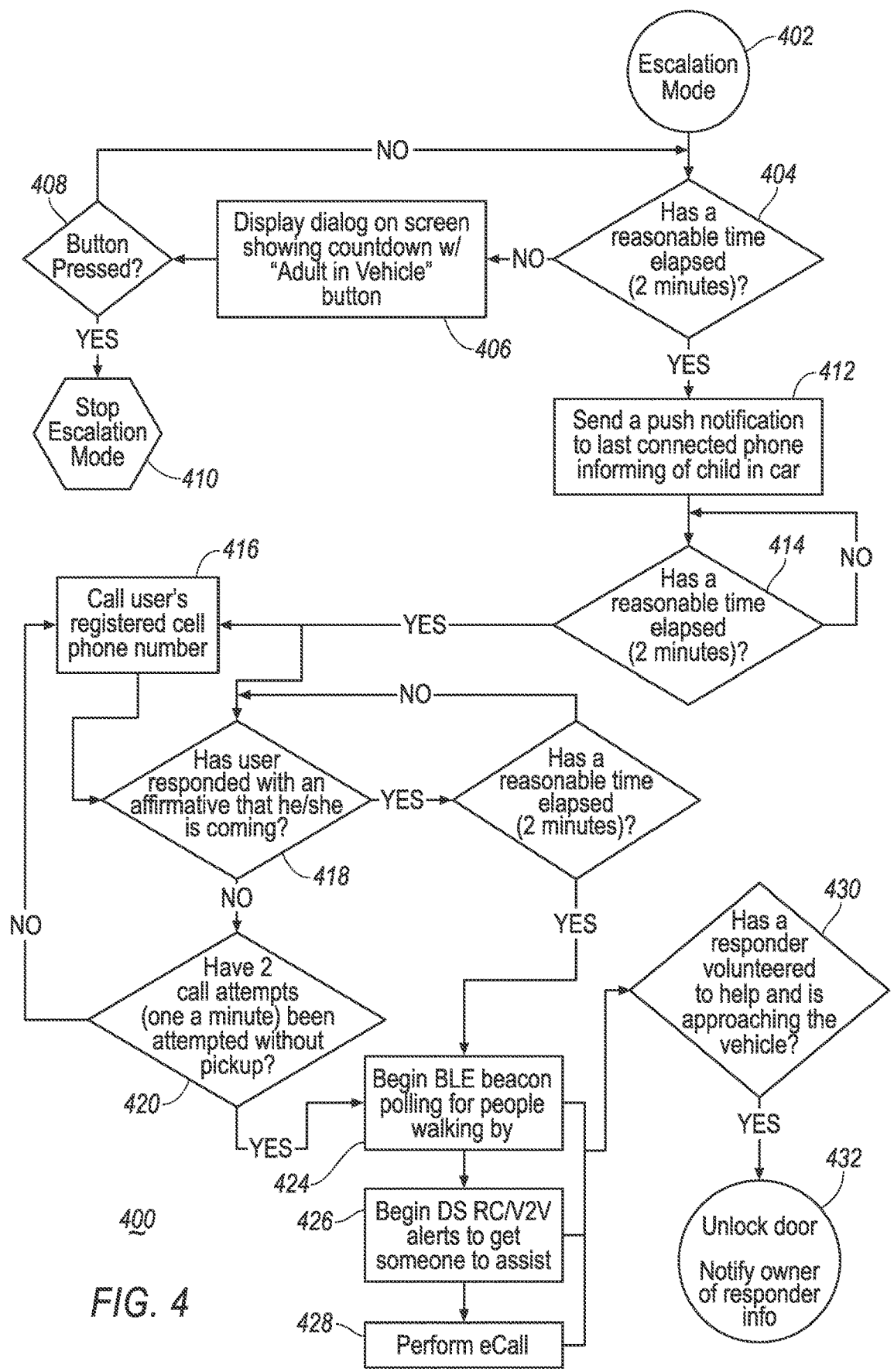
FIG. 4 illustrates an example flow diagram of a process for an escalation mode notification of one embodiment of the present disclosure.

FIG. 4 illustrates an example flow diagram of a process 400 for an escalation mode notification of one embodiment of the present disclosure. Compared with the process 300 illustrated in FIG. 3, the process 400 for escalation mode notification may further improve the chance for the child to be rescued by notifying a third party about the situation. At operation 402, the computing platform 104 initiates the escalation mode notification. At operation 404, the computing platform 104 checks whether a predefined time period (e.g., 2 minutes) has elapsed since the vehicle 102 is stopped and the ignition is turned off. As discussed above, the reasonable time period illustrated in FIG. 4 is only an example and other length of time may be used. If the reasonable time period has not elapsed yet, the control is passed to operation 406.

At operation 406, the computing platform 104 may be configured to display a dialog on the display 118 showing a timer countdown (e.g., 2 minutes) and invite the user to push an "Adult in vehicle" button. In case that the display 118 is provided with touch screen capability, the button may be displayed on the display 118. Otherwise, the computing platform 104 may invite the user to press a physical button (e.g., a steering wheel button) controlled by the HMI controls 114 instead. One of the purposes of operation 406 is to verify whether a conscious adult is present in the vehicle. Alternatively, the presence of an adult in the vehicle may be automatically detected by an inward camera (not shown). As an example, the inward camera may be inside the cabin near the roof of the vehicle 102 configured to detect adults on both the front and back seats. At operation 408, if the computing platform 104 determines the "Adult in vehicle" button is pressed indicating there is an adult still in the vehicle and he/she is conscious, the child is probably safe to be in the vehicle 102. Therefore, no actions need to be taken and the escalation mode stops at operation 410.

If no user response is received within the reasonable time period, the control is passed to operation 412. At operation 412, the computing platform 104 may send a push notification to the last connected mobile device 210 informing of the child in the car. As an example, the push notification may be sent via the communication network 150 and the mobile device may display the notification using a mobile application. Alternatively, if the mobile device 210 is still at the vicinity of the vehicle 102 and connected to the computing platform 104 via the wireless connection 222, the push notification may be sent to the mobile device through the wireless connection 222 directly. As an example, the push notification may include an option asking the user to confirm that he/she is coming to the vehicle 102 to get the child. After sending the push notification, the computing platform may be configured to give the user a reasonable time to respond, and the control is passed to operation 414.

At operation 414, the computing platform 104 checks whether the predefined time period (e.g., 2 minutes) has elapsed. Here, the predefined time period may be different from the time at operation 404. If no appropriate respond is detected, i.e., the child is still in the smart child seat 160, the control is passed to operation 416 and the computing platform 104 may be configured to call the user's registered cell phone number to notify about the situation. The content of the call may be a computer-generated voice message, or alternatively a previously recorded message. Similar to the push notification, the phone call may provide the user with an option to confirm that he/she is coming, such as by pressing the # key. As an example, the computing platform 104 may be configured to make a second attempt to call the user's registered cell phone number in case that the first phone call is not picked up. At operation 418, if the computing platform 104 receives the confirmation from either the push notification from operation 412 or the phone call from operation 416, the process continues to operation 422, where another reasonable time period (e.g., 2 minutes) is set to allow the user to take actions. If no such confirmation is received, at operation 420 the computing platform 104 may check whether the second call attempt has been made. If not, the control is returned to operation 416 and the computing platform makes the second attempt. If at operation 420 it is determined that two attempts have been made without pickup indicating the user is unavailable, the control continues to operation 424 to summon help from other parties.

At operation 424, the computing platform 104 may perform BLE beacon polling for people walking by. As an example, the polling may be performed using the Bluetooth module 124 via the wireless transceiver. Alternatively, the computing platform may direct the central smart module 162 of the smart child seat 160 to perform the polling. The idea of operation 424 involves when passersby who carry devices compatible with BLE protocol are at the vicinity of the vehicle 102, they may be able to help responsive to the polling. An option may be given to allow the passersby to confirm whether they are going to help.

At operation 426, the computing platform 104 may send out DSRC/V2V (Vehicle-to-Vehicle) alerts to get help from other vehicles nearby. The DSRC alert may be sent by the DSRC module 146 through the wireless transceiver 128. An option may be given to allow the vehicles to confirm whether they are going to help.

At operation 428, the computing platform 104 may perform an eCall to a third party to notify about the situation. As an example, the eCall may be made to the 911 operator with the location information of the vehicle 102.

At operation 430, if a confirmation from any of the responder from operations 424, 426 and 428 is received, indicating someone volunteered to help, the control continues to operation 432, where the computing platform 104 may unlock the doors through the BCM 132 to facilitate the rescue. In addition, the computing platform 104 may send a notification to the owner's registered mobile device about the responder's information.

FIG. 5 illustrates an example flow diagram of a background process 500 of one embodiment of the present disclosure. As an example, the background process 500 may be performed in parallel to the child seat notification process 300 and the escalation mode process 500. One of the purposes of the background process 500 is to prevent overheating and hypothermia of the child while waiting for help to arrive.

At operation 502, the computing platform 104 may check whether the temperature inside the vehicle 102 has dropped below a low threshold temperature (e.g., 50° F.) when the child may begin to feel cold. The temperature detection may be performed by the temperature sensor 148 via the climate control 136. Alternatively, the temperature data may be collected using the temperature sensor 170 of the smart child seat 160. If the temperature inside the vehicle 102 is below the low threshold, the control is passed to operation 504.

At operation 504, the computing platform 104 may determine whether the vehicle 102 is located outdoors. As an example, the computing platform 104 may use the GPS module 112 to determine the location of the vehicle 102. Additionally or alternatively, the computing platform 104 may use other components such as a camera, radar or lidar to determine whether the vehicle is outdoors. If the vehicle 102 is outdoors, the control continues to operation 512, where the computing platform 104 may start the vehicle engine using the PCM 134 and activate the climate control system through climate control module 136, so as to adjust cabin temperature of the vehicle 102 to an appropriate level. One of the purpose of operation 504 is that if the vehicle is indoors, it will be dangerous to start the engine because of the emission for vehicles having a traditional gasoline/diesel engine. Alternatively, the computing platform 104 may be configured to user power from the lead acid battery only to a certain extend without starting the engine. In this case, the operation 504 may be skipped because no emission is produced. Additionally or alternatively, for electric vehicles, the operation 504 may be skipped because they do not produce any emission.

At operation 506, the computing platform 104 may check whether the temperature inside the vehicle 102 has raised above a high threshold temperature (e.g., 100° F.) when the child may suffer overheating. If the high temperature threshold is met, the control is passed to operation 508.

At operation 508, similar to operation 504, the computing platform 104 may determine whether the vehicle 102 is outdoors. If the vehicle 102 is outdoors, the control is passed to operation 512 and the climate system is activated. If the vehicle is indoors, the control continues to operation 510. At operation 510, the computing platform 104 may open windows of the vehicle 102 through the BCM 132. Although the climate system is not activated, opening windows may be helpful to cool the vehicle down. Similarly, operation 508 may not be necessary in case of an electric vehicle with no emission.

The 50° F. low threshold temperature and 100° F. high threshold temperature are merely examples to illustrate the embodiment. Other threshold temperatures may be used. For instance, the threshold temperatures may be a function of the time with linear and non-linear responses.

Referring to FIG. 6A, an example screenshot of the push notification 602 displayed on the mobile device 210 from operation 412 of FIG. 4 is illustrated. The push notification 602 may include three major components. A brief word description 610 of the situation may be displayed on the upper portion of the notification 602. In this case, the description 610 may include "Your Smart Child Seat has detected your child is still in the vehicle under dangerous high heat conditions." An icon demonstrating the situation may be displayed in the middle portion of the notification 602. At the lower portion, the notification 602 may provide options for the user to take actions. As an example, the options may include "On my way!" which indicates the user is coming to get the child shortly, and "Open windows" which instructs the computing system 104 to open windows to help reduce cabin temperature.

Referring to FIG. 6B, an example screen shot of the polling notification 604 displayed on a mobile device belonging to a passerby from operation 424 of FIG. 4 is illustrated. Similar to the notification 602 for the user, the notification 604 for the passerby may include a brief word description 620 of the situation located at the upper portion of the notification screen. As an example, the description may include "A vehicle nearby may have a child trapped inside under dangerous high heat condition. Please consider assisting." A digital map 622 showing both the location of the passerby 626 and the location of the vehicle 628 is displayed at the middle portion to help the passerby find the vehicle 102. As an example, the mobile application displaying the push notification may integrate map applications of a third part, such as Google Maps, or Apple Maps, to display the locations. At the lower portion of the screen, the notification 604 may include options 624 asking the passerby to choose whether to help or not.

Figure 7:
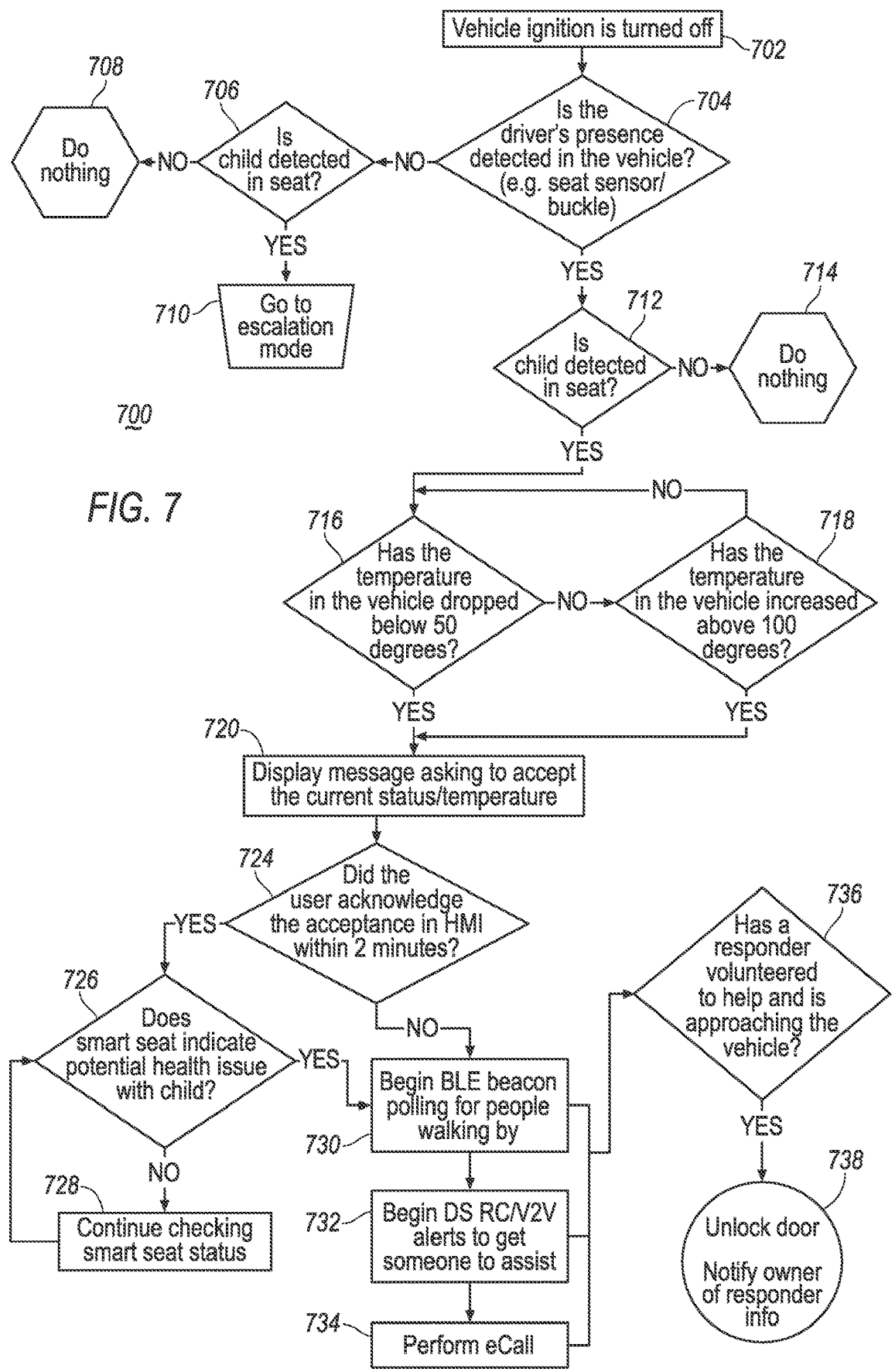
FIG. 7 illustrates an example flow diagram for a child left behind notification process of another embodiment of the present disclosure.

FIG. 7 illustrates an example flow diagram for a child left behind notification process 700 of another embodiment of the present disclosure. At operation 702, the computing platform 104 detects the vehicle 102 has stopped and the ignition has been turned off, indicating the vehicle has been parked. At operation 704, the computing platform 104 checks whether a driver or user is still in the vehicle 102. As an example, the computing platform 104 may use the driver/passenger seat sensors or the seat belt buckle sensor to determine whether the user is still in the vehicle 102. If the computing platform 104 determines that the user has gone out of the vehicle 102, the control is passed to operation 706 to determine whether there is a child in the smart child seat 160. If there is no child in the smart child seat 160, the process ends at operation 708 without doing anything. If, however, the computing platform 104 determines that a child is still in the smart child seat 160, the control is passed to operation 710 to enter the escalation mode as discussed with reference to FIG. 4.

If at operation 704 the computing platform 104 determines that the user is still in the vehicle 102, the control continues to operation 712. Similar to operation 706, if no child is detected in the smart child seat 160 at operation 712, the process ends at operation 714 without doing any further actions. However, if a child is detected at operation 712, the control is passed to operations 716 and 718 for temperature check. The process at operations 716 and 718 is similar to the background process illustrated in FIG. 5 with reference to operations 502 and 506 to determine whether the cabin temperature of the vehicle 102 is dangerously hot or cold. If the cabin temperature is beyond either the low threshold or the high threshold indicating potential danger to the child, the process continues to operation 720.

At operation 720, the computing platform 104 displays a message on the display 118 asking the user to accept the current status/temperature. One of the purposes of operation 720 is to verify if the user is still in the vehicle 102 and he/she is conscious and capable of looking after the child. A timer will be set for a reasonable time period (e.g., 2 minutes) to allow the user to accept the current status using the HMI controls 114. At operation 724, if the computing platform 104 receives the user acknowledgement via the HMI within the reasonable time period, the control is passed to operation 726, otherwise, the control is passed to operation 730.

At operation 726, the computing platform 104 may determine whether sensor signals sent from the smart child seat 160 indicates any potential health issue with the child. As a few nonlimiting example, the potential health issue may include overheating and hypothermia detected by the temperature sensor 170; dehydration detected by the moisture sensor 172; excessive harness tension detected by the harness tension sensor 176; and positional asphyxia detected by the heartbeat sensor 184 and the oximeter sensor 186. If no such potential health issue is detected, the computing platform 104 may continue to check the smart child seat status at operation 728. If any potential health issue is detected, the control is passed to operation 730.

Operations 730 to 738 are similar to operations 424 to 432 illustrated in FIG. 4. The computing platform 104 may make attempts to summon a third party's help to come to rescue.

Figure 8:
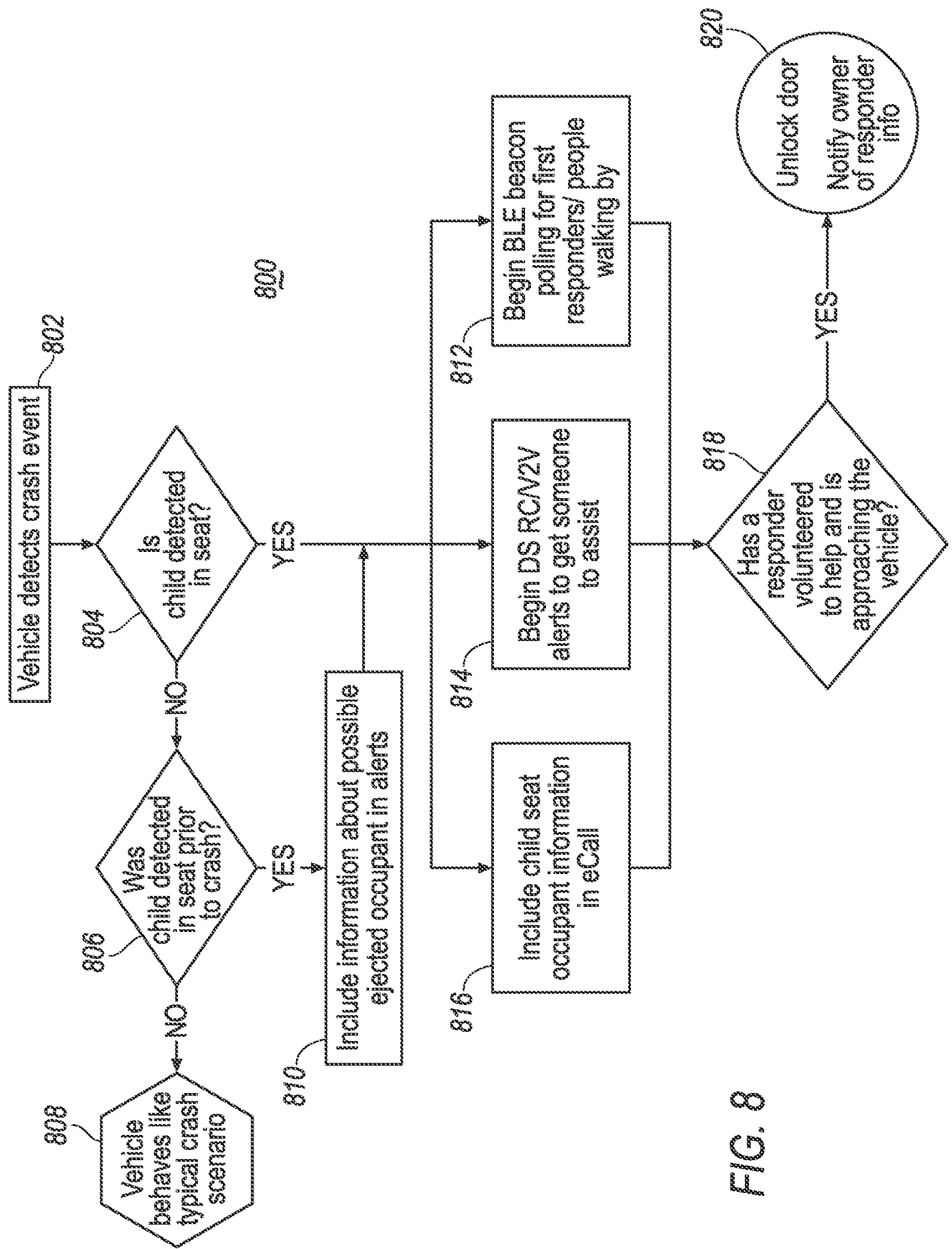
FIG. 8 illustrates an example flow diagram for a notification process in a vehicle crash situation of one embodiment of the present disclosure.

FIG. 8 illustrates an example flow diagram for a notification process 800 in a vehicle crash event of one embodiment of the present disclosure. At operation 802, the computing platform 104 detects a crash event. The crash event may be detected using an airbag sensor installed onto the vehicle 102. At operation 804, the computing platform 104 may detect whether there is a child in the smart child seat 160 after the detection of the crash event. If a child is detected in the smart child seat 160, the control is passed to operations 812 to 820, which are similar to operation 424 to 432 illustrated in FIG. 4, to summon a third party's help to come to rescue.

If at operation 804 no child is detected, the control is passed to operation 806 to determine whether there was a child in the smart child seat 160 before the crash event. If there was no child in the smart child seat 160, the control is passed to operation 808 and no further actions regarding the smart child seat 160 is taken. If, however, the computing platform 104 determines that a child was present in the smart child seat 160 prior to the crash event, it is possible that the child is ejected from the seat due to the impact of the crash event. In this case, the control continues to operation 810 and the computing platform 104 may include the possible ejected occupant information in the alert to be sent out at operations 812 to 820.

Computing devices described herein, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a vehicle, comprising:
a wireless transceiver, configured to wirelessly communicate with a car seat installed in the vehicle; and
a controller, programmed to
responsive to detecting a safety event indicative of a child being left in the vehicle in a dangerous condition based on data received from the car seat indicative of a presence of the child in the car seat and to a failure to receive confirmation that an adult occupant is still in the vehicle, send, via a server over a wireless network, a warning to a mobile device that is last connected to the vehicle before the safety event, and
responsive to a failure to receive a response from the mobile device within a predefined timeframe, activate a wireless beacon to transmit a rescue request to a third party device via the transceiver through a direct wireless connection.

2. The system of claim 1, wherein the controller is further programmed to open a window of the vehicle responsive to at least one of:
receipt of an open window signal from the mobile device via the wireless network; or
elapse of a predefined time period without the controller receiving a response from the registered mobile device.

3. The system of claim 2, wherein the controller is further programmed to turn on the climate system.

4. The system of claim 1, wherein the direct wireless connection is at least one of a Bluetooth Low Energy (BLE) Beacon or a Dedicated Short-Range Communications (DSRC) channel.

5. The system of claim 1, wherein the controller is further programmed to unlock a door of the vehicle responsive to receiving, via the direct wireless connection, the third party accepting the rescue request via the third party device.

6. The system of claim 1 wherein the controller is further programmed to obtain data indicative of a location of the vehicle, and send a rescue request including the location data to an emergency operator.

7. The system of claim 1, wherein the dangerous condition includes at least one of cabin temperature being lower than a first predefined temperature threshold or cabin temperature being higher than a second predefined temperature threshold.

8. The system of claim 7, wherein the controller is further programmed to obtain data indicative of location of the vehicle, and
when the location data indicates the vehicle is outdoors, start an engine of the vehicle and turn on a climate system.

9. The system of claim 1, wherein the controller is further programmed to:
responsive to failure to receive a response from the mobile device, make at least one phone call to the mobile device via the wireless network.

10. The system of claim 1, wherein the controller is further programmed to:
responsive to receiving a negative response from the mobile device indicative of a user is unable to respond to the safety event, activate the wireless beacon to transmit the rescue request to the third party device via the transceiver through the direct wireless connection.

11. A system for a vehicle, comprising:
one or more wireless transceivers; and
a processor, programmed to
responsive to a crash event, check whether a child is present in a car seat having sensing capability and wirelessly connected to the system via one of the wireless transceivers,
send a rescue request to a third party device using Bluetooth Low Energy (BLE) Beacon via one of the wireless transceiver through a first direct wireless connection, and
send the rescue request to a nearby vehicle via the transceiver through a vehicle-to-vehicle (V2V) direct connection.

12. The system of claim 11, wherein the processor is further programmed to determine whether a child is previously present in the car seat before the crash event responsive to a detection of no child is present after the crash event.

13. The system of claim 12, wherein the processor is further programmed to include a possible ejected occupant information in the rescue request.

14. The system of claim 11, wherein the controller is further programmed to obtain location data of the vehicle, and provide the location data to an emergency operator.

15. The system of claim 11, wherein the controller is further programmed to:
responsive to receiving a response from one of the third party device and nearby vehicle, unlock a door of the vehicle and notify a user of the vehicle about an identity of a responder, wherein the response includes the identity of the responder.

16. A vehicle system, comprising:
one or more wireless transceivers; and
a controller, programmed to
to receiving a sensor signal from a car seat indicative of a safety event, send, via a server over a wireless network, a warning to a mobile device that is last connected to the vehicle before the safety event, and, wherein the controller is wirelessly connected to a central smart module of the car seat configured to collect signals from a plurality of sensors installed on the car seat,
responsive to a failure to receive a response from the mobile device within a predefined timeframe, activate a vehicle-to-vehicle (V2V) beacon to transmit a rescue request to a nearby via one of the wireless transceivers through a direct V2V connection, wherein the rescue request includes a location of the vehicle system.

17. The vehicle system of claim 16, wherein the controller is further programmed to communicate with the car seat using Bluetooth Low Energy (BLE) protocol.

18. The vehicle system of claim 16, wherein the safety event includes at least one of: harness unbuckling; lateral sway; incorrect harness tension; asphyxiation; excessive moisture; incorrect weight on the car seat.

19. The vehicle system of claim 16, wherein the controller is further programmed to:
responsive to the failure to receive the response from the mobile device within a predefined timeframe, activate a wireless beacon to transmit the rescue request to a third party device via one of the wireless transceivers through a direct wireless connection.

* * * * *